(12) United States Patent
Vidusek et al.

(10) Patent No.: US 9,168,545 B2
(45) Date of Patent: Oct. 27, 2015

(54) SPRAY NOZZLE ASSEMBLY WITH IMPINGEMENT POST-DIFFUSER

(71) Applicant: Spraying Systems Co., Wheaton, IL (US)

(72) Inventors: Daniel Vidusek, Hampshire, IL (US); Bandish Patel, Carol Stream, IL (US)

(73) Assignee: Spraying Systems Co., Wheaton, IL (US)

( * ) Notice: Subject to any disclaimer, the term of this patent is extended or adjusted under 35 U.S.C. 154(b) by 245 days.

(21) Appl. No.: 13/949,506

(22) Filed: Jul. 24, 2013

(65) Prior Publication Data

US 2015/0028132 A1     Jan. 29, 2015

(51) Int. Cl.
| | |
|---|---|
| *B05B 7/06* | (2006.01) |
| *B05B 1/26* | (2006.01) |
| *B05B 7/10* | (2006.01) |
| *B05B 7/08* | (2006.01) |
| *B05B 7/04* | (2006.01) |

(52) U.S. Cl.
CPC ... *B05B 7/10* (2013.01); *B05B 1/26* (2013.01); *B05B 7/0892* (2013.01); *B05B 7/0483* (2013.01)

(58) Field of Classification Search
CPC .............................. B05B 7/10; B05B 7/0892
USPC .............. 239/432, 501, 416.5, 467, 469, 482, 239/483
See application file for complete search history.

(56) References Cited

U.S. PATENT DOCUMENTS

| | | | | |
|---|---|---|---|---|
| 2,072,281 | A | * | 3/1937 | Simonin ........................ 239/402 |
| 5,732,885 | A | * | 3/1998 | Huffman ..................... 239/416.5 |
| 6,161,778 | A | * | 12/2000 | Haruch .......................... 239/290 |
| 6,322,003 | B1 | * | 11/2001 | Haruch .......................... 239/290 |
| 6,394,366 | B1 | * | 5/2002 | Adams ........................... 239/463 |
| 7,036,753 | B2 | | 5/2006 | Huffman |
| 2011/0147491 | A1 | * | 6/2011 | Pope et al. ..................... 239/398 |

* cited by examiner

*Primary Examiner* — Arthur O Hall
*Assistant Examiner* — Tuongminh Pham
(74) *Attorney, Agent, or Firm* — Leydig, Voit & Mayer, Ltd.

(57) ABSTRACT

An internal mix air atomizing spray nozzle assembly having a nozzle body that defines a central liquid flow passage, an air guide for directing pressurized air within the nozzle, and a downstream air cap having an upstanding impingement post and a plurality of discharge orifice defining passages about the impingement post. The air cap passages each are oriented at compound angle with respect to a central axis for discharging atomized liquid flow streams in a conical spray pattern swirling in a predetermined rotative direction about the central axis, and the impingement post has a diffuser cap that defines a flat central liquid impingement surface and an outer annular array of non radial diffuser veins for directing the atomized liquid and pressurized air in a swirling fashion about the impingement post in the same relative direction as the swirling spray pattern from the air cap passages.

20 Claims, 6 Drawing Sheets

SPRAY NOZZLE ASSEMBLY WITH IMPINGEMENT POST-DIFFUSER

FIELD OF THE INVENTION

The present invention relates generally to spray nozzle assemblies, and more particularly, to pressurized air internal mix spray nozzle assemblies in which liquid is atomized by pressurized air prior to discharge from the nozzle.

BACKGROUND OF THE INVENTION

Internal mix spray nozzle assemblies are known that utilize pressurized air for breaking down liquid into relatively small size particles. Such spray nozzle assemblies have particular utility in gas scrubbing applications, such as where lime slurry or the like is atomized and sprayed into a discharging stream of combustion gases for removing sulfur dioxide or other combustion byproducts. For efficient combustion gas scrubbing, it is necessary that the slurry be atomized into a very fine liquid particle spray.

Such spray nozzle assemblies commonly direct the finely atomized liquid from a plurality of circumferentially spaced discharge orifices of an air cap of the nozzle so as to generate an outwardly expanding conical spray pattern. During operation, fine particles of the high pressure discharging flow streams from the plurality of discharge orifices can migrate inwardly back toward the nozzle and create a heavy buildup of particulate matter about the discharge orifices that choke off the spray and significantly degrade performance. This creates the need for frequent costly cleaning of the air cap of such buildup.

To minimize such build up, it is known to form the discharge orifices of the air cap at compound angles to the axis of the spray nozzle so as to impart a tangential like swirling action of the discharging sprays. However, the increased surface areas of such angled discharge orifices can be subject to substantial wear in only a few days, as depicted in FIG. 7 by the wear "w" in the discharge orifices of an air cap of a prior art spray nozzle assembly, necessitating costly field repair or replacement.

OBJECTS AND SUMMARY OF THE INVENTION

It is an object of the present invention to provide an internal mix pressurized air atomizing spray nozzle assembly that is effective for atomizing liquids, such as lime slurries and the like in gas scrubbing or other applications, into a finer liquid particle spray for enhanced spray performance and without extensive buildup on the outside of the air cap of the nozzle assembly.

Another object is to provide a spray nozzle assembly as characterized above that is adapted for minimizing and/or preventing wear to the discharge orifices of the air cap that adversely effects spray performance and require costly replacement.

A further object is to provide a spray nozzle assembly of the foregoing type that is relatively simple in construction and lends itself to economical manufacture. A related object is to provide such a spray nozzle assembly design which lends itself to easy and economical retrofitting of spray nozzles in the field.

Other objects and advantages of the invention will become apparent upon reading the following detailed description and upon reference to the drawings, in which:

Figure 1:
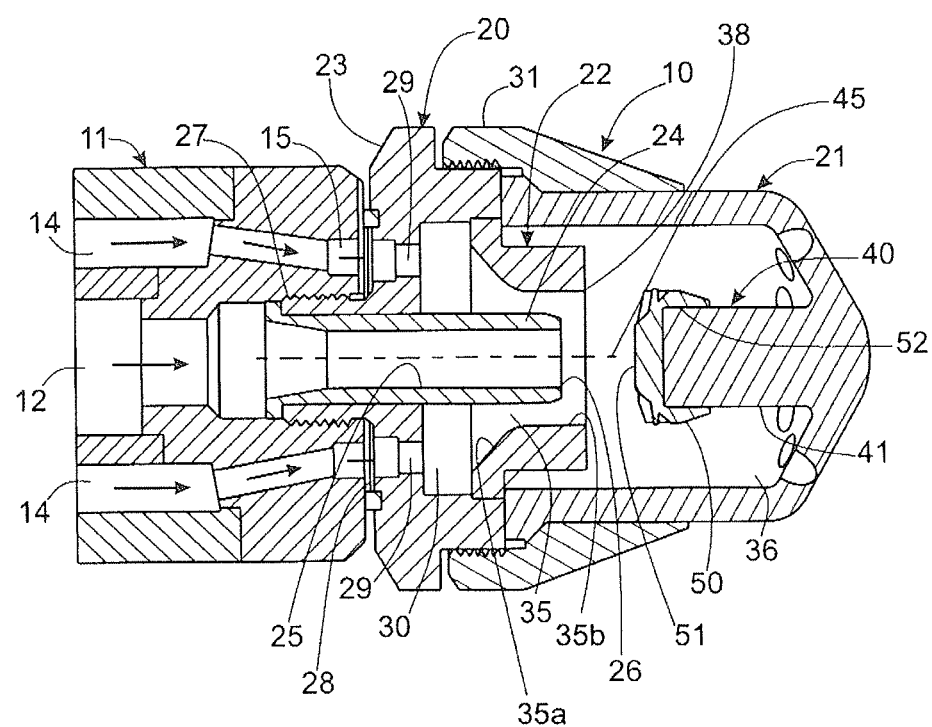
FIG. 1 is a longitudinal section of an illustrated spray nozzle assembly in accordance with the invention taken in the plane of line 1-1 in FIG. 2.
Figure 2:
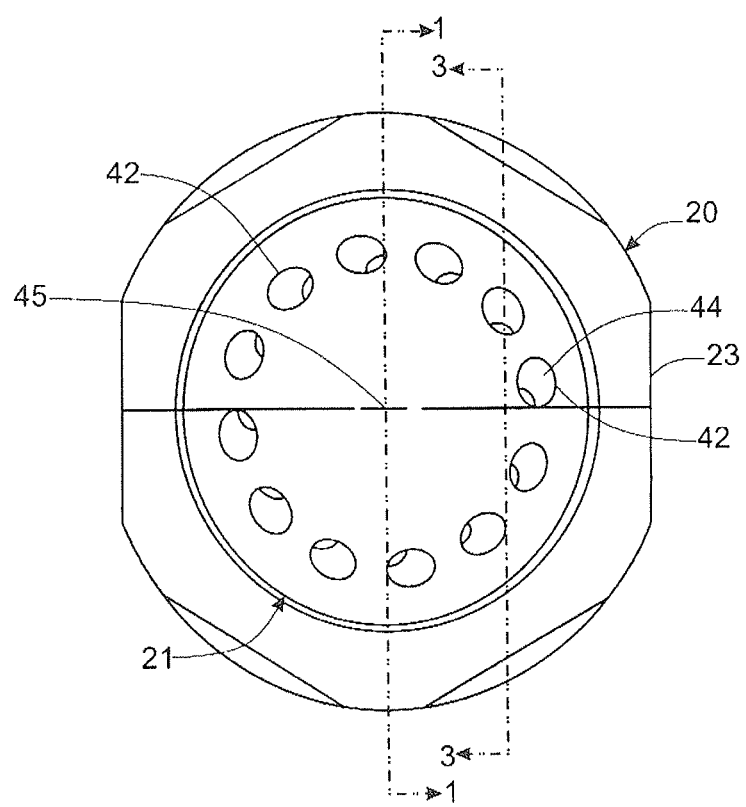
FIG. 2 is a downstream end view of the spray nozzle assembly shown in FIG. 1.
Figure 3:
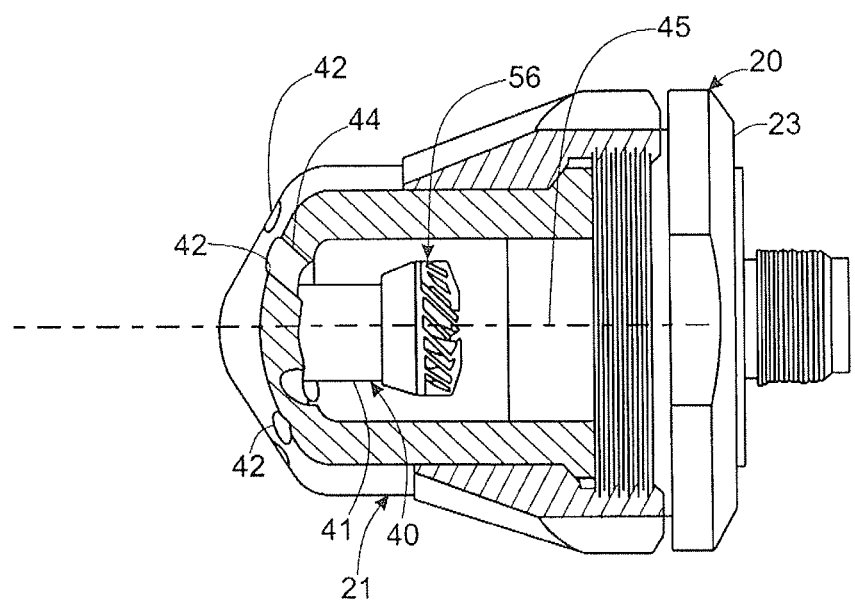
FIG. 3 is a longitudinal section of the illustrated spray nozzle assembly taken in the plane of line 3-3 in FIG. 2.
Figure 4:
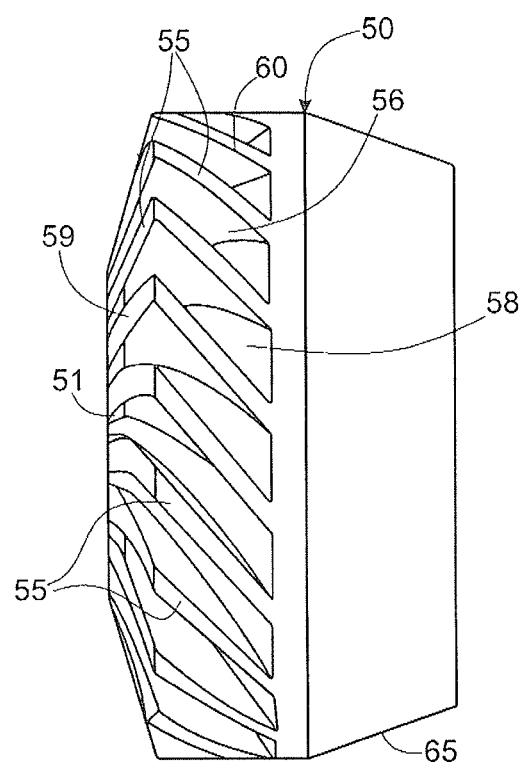
FIG. 4 is an enlarged side elevational view of the impingement post diffuser of the illustrated spray nozzle assembly.
Figure 5:
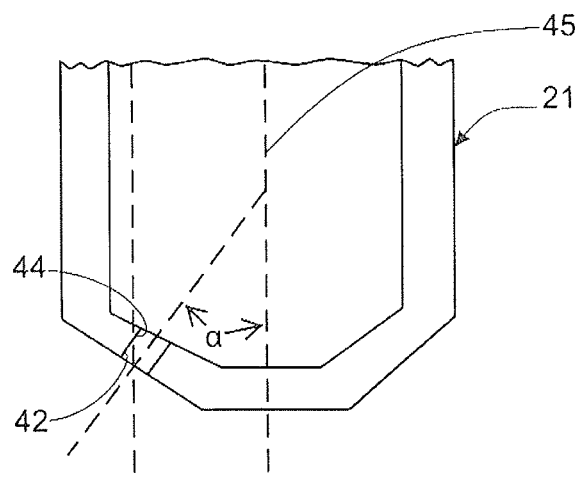
FIG. 5 is a diagrammatic sectional depiction of the air cap of the illustrated spray nozzle assembly taken in the plane of line 5-5 in FIG. 6, showing the outwardly extending angle of inclination of one of the air cap discharge orifices with respect to a central axis.
Figure 6:
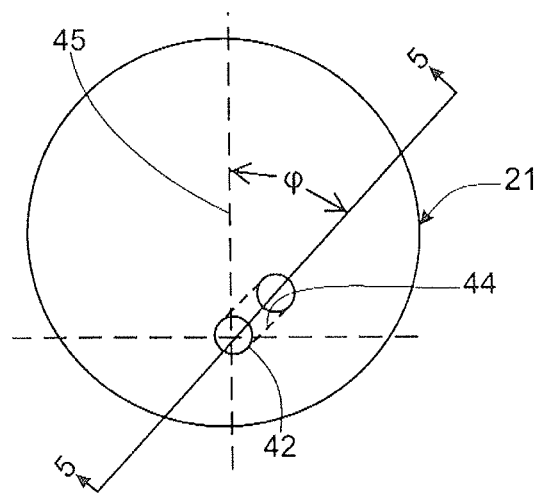
FIG. 6 is a diagrammatic end view of the air cap show in FIG. 5, showing the transverse angle of inclination of the air cap discharge with respect to the central axis.

While the invention is susceptible of various modifications and alternative constructions, a certain illustrative embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention. In that regard, while the illustrated spray nozzle assembly is particularly effective for atomizing and spraying lime slurries and the like in combustion gas scrubbing applications, the utility of the nozzle assembly is not limited to that usage.

DESCRIPTION OF THE PREFERRED EMBODIMENT

Referring now further to the drawings, and particularly FIG. 1, there is shown an illustrative internal-mix, pressurized air-atomizing spray nozzle assembly 10 in accordance with the invention connected to a conventional fluid supply manifold 11. The fluid supply manifold 11 in this case includes a central pressurized liquid supply passage 12 and a plurality of pressurized air supply passages 14 in surrounding relation to the liquid supply passage 12. The air passages 14 in this instance communicate with an annular manifold air passage 15 at a downstream end of the fluid supply manifold 11.

The illustrated spray nozzle assembly 10 basically comprise a nozzle body 20, a downstream air cap 21, and an air guide 22 interposed between the nozzle body 20 and air cap 21. The nozzle body 20 in this case is in the form of a multipart fluid supply subassembly comprising an outer annular body member 23 and an inner axial liquid supply tube 24 fixed therein which defines a liquid flow passage 25 along a central axis 45 of the spray nozzle assembly 10 having a discharge orifice 26. The outer annular body member 23 has an externally threaded, upstream stem 27 secured within a threaded axial bore of the fluid supply manifold 11 with the liquid supply tube 24 in fluid communication with the liquid supply passage 12. An annular sealing gasket 28 is interposed between the annular body member 23 and the downstream end of the fluid supply manifold 11. The annular body member 23 further is formed with a plurality of circumferentially spaced axial air passageways 29 that communicate between the annular manifold air passage 15 and an air chamber 30 about the liquid supply tube 24.

The air cap 21 is secured to the nozzle body 20 by a threaded retaining cap 31 with the air guide 22 retained between an upstream end of the air cap 21 and a downstream end of the outer nozzle body member 23. The air cap 21 in this instance retains the air guide 22 in seated relation within a downstream counter bore of the outer annular body member 23. The illustrated air guide 22 has an annular shape and is supported in surrounding relation to the liquid supply tube 24 for defining an annular air passageway 35 communicating with the air chamber 30 and a downstream expansion chamber 36 within the air cap 21. The annular air passageway 35 includes an inwardly curved entry section 35a and a downstream cylindrical section 35b which defines an air discharge opening 38 a short distance beyond the end of the liquid supply tube 24. The annular air guide passageway 35 directs pressurized air into the expansion chamber 36 of the air cap 21 simultaneously as liquid is directed through and discharges from the discharge orifice 26 of the liquid supply tube 24.

The liquid discharging from the liquid supply pipe 24 impacts an upstanding impingement post or pin 40 of the air cap 21 which facilitates both mechanical and air atomized liquid particle breakdown of the liquid. The impingement post 40 in this case includes an upwardly standing post section 41 integrally formed with the air cap 21, and the air cap 21 has a plurality of discharge orifices 42 defined by respective cylindrical passages 44 dispose in surrounding relation to the post section 41.

Figure 7:
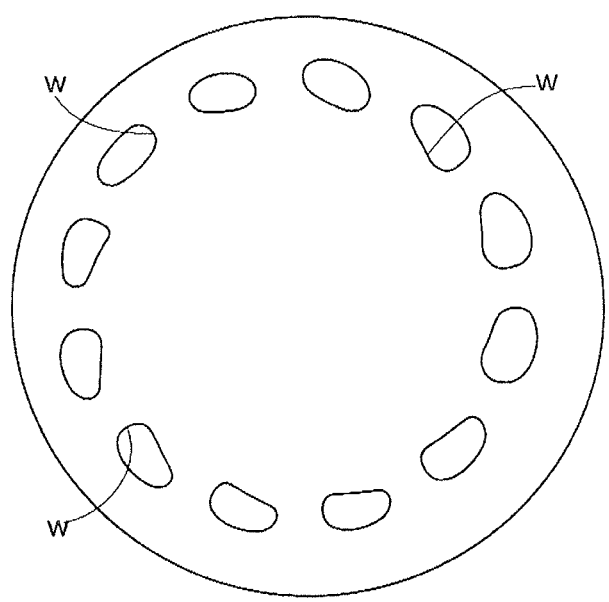
FIG. 7 is an enlarged end view of an air cap of a prior art spray nozzle assembly showing wear "w" in the angled discharge orifices resulting from the spraying of lime slurries in a gas scrubbing application.

For minimizing liquid particle buildup about the air cap discharge orifices 42 during spraying of lime slurries and the like, the discharge orifice defining passages 44 each extend at a compound angle to the central axis 45 of the spray nozzle assembly so as to discharge atomized liquid flow streams in an outwardly expanding conical spray pattern with a tangential or transverse flow component for swirling the finely atomized spray particles in a predetermined rotative direction about the central axis 45. In the illustrated embodiment, the passages 44 extend in a downstream direction at a first outwardly expanding angle $\alpha$, such as 45 degrees, to the central axis when viewed in a vertical plane through the passage, as depicted in FIG. 5, and at a second angle $\phi$, such as 50 degrees, to a longitudinal plane through the central axis 45 as viewed from a discharge end of the air cap 21, as depicted in FIG. 6, such that the discharging flow streams from the air cap discharge orifices 42 are emitted in a common counterclockwise swirling direction, as viewed in FIG. 2. For purposes herein, the term "compound angle" is intended to mean an angle that extends both outwardly and transversely with respect to the central axis of the nozzle.

In accordance with the invention, the impingement post is designed for (1) receiving direct impact of the incoming liquid flow stream from the liquid discharge orifice for shattering and transversely directing the liquid for interaction with the incoming pressurized air flow stream and (2) for helically or angularly directing the atomized liquid and pressurized air about the impingement post in the same rotative direction as the discharging spray for the air cap for direction through the air cap discharge orifices defining passages in a manner that enhances liquid particle breakdown and minimizes wear to the air cap discharge orifices. In the illustrated embodiment, the impingement post 40 has an annular diffuser 50 in the form of a diffuser cap mounted on the end of the upstanding post section 41 which defines a central flat impingement surface 51 against which the liquid flow stream introduced into the air cap 21 directly impinges and is transversely shattered. The diffuser 50 in this case is cup shaped with a central cylindrical recess 52 positioned on and retained by the impingement post section 41, such as by a press fit. An outer end wall of the diffuser 50 defines the impingement surface 51, which in this case is circular in shape and sized about the same or slightly larger than the liquid discharge orifice 26.

In keeping with this embodiment, the diffuser 50 is formed with an outer annular array of angled veins 55 that define a plurality of angled or curved helical like flow directing channels 56 that extend outwardly and downstream from the central impingement surface 52 in a non radial angle to the central axis 45 of the spray nozzle assembly 10 in a similar counterclockwise direction, as view in FIGS. 2 and 3, to that of the air cap passages 44. The diffuser 50 in this instance has a frustoconical end 58 facing the liquid discharge orifice 26 with a conical side wall at an angle to the central axis 45 from which the veins 55 extend. The illustrated angled veins 55 have a uniform relatively thin thickness and extend outwardly of the frustoconical end 58 of the diffuser in slightly curved fashion oriented in the counterclockwise direction. The veins 55 in this case have upstream ends 59 that taper at a slight angle, such as about 15 degrees, rearwardly from the central impingement surface 51 and outer sides 60 that extend nearly parallel to the central axis 45 along the outer periphery of the diffuser 50. By virtue of the veins extending from the conical end 56 of the diffuser, the flow channels 58 become deeper as they progress away from the impingement surface 51. The diffuser 50 preferably has an outer diameter about the same as the diameter of the annular air guide discharge opening 38. Depending upon the size of the diffuser 50, preferably the number of veins 55 is greater than the number of air cap discharge orifices 42. In practice, the number of veins preferably is between about 10 and 22. A rear side wall 65 of the diffuser 50 in this case has a conical shape angled inwardly from the outer periphery of the veins 55 to about the outer perimeter of the post section 41 for providing a smooth transition between the veins 55 and the post section 41 for preventing a sharp corner that could create undesirable turbulence in the liquid and pressurized gas flow. The diffuser 50 preferably is molded of a wear-resistant material, such as stellite or ceramic. While in the illustrated embodiment, the diffuser 50 is a separate component mounted on an upstanding post section 41 of the air cap 21, it will be understood that alternatively the post section 41 and diffuser 50 could be integrally formed.

In operation, it will be seen that the liquid flow stream introduced into the air cap 21 from the liquid discharge orifice 26 will directly impact the impingement surface 51 of the diffuser 50 shattering and transversely directing the liquid radially outwardly of the impingement surface. The angled veins 55 simultaneously direct the transverse shattered liquid and the axial pressurized air stream from the air guide inlet opening 38 into the expansion chamber 36 in tangential or helical fashion relative to the central axis 45 of the air cap 21 for enhanced interaction and atomization of the liquid and for more direct entry of the atomized liquid into the air cap passages 44 which are angled in the same transverse direction as the veins 55. The angled veins 55 of the diffuser 50 unexpectedly have been found to enhance atomization of the liquid with up to 10% finer particles over spray nozzle assemblies without the diffuser, while enabling the atomized liquid to pass through and discharge passages 44 from the air cap 21 in a manner that minimizes wear about the discharge orifices 42.

While the theory of operation is not completely understood, it is believed that in conventional internal mix pressurized air atomizing spray nozzles, such as those used for directing slime slurry and the like in combustion gas scrubbing applications, at least a portion of the high-pressure axial air stream travels axially through the air cap forcefully directing and impinging the atomized liquid against the angle sides of the angled air cap discharge orifices. Moreover, the change in direction of the pressurized air and atomized liquid flow stream in order to enable passage through the angled discharge orifices of the air cap has been found to increase the velocity of the flow streams resulting in wear "w" about the discharge ends of the orifices, as depicted in FIG. 7. On the other hand, in the subject spray nozzle assembly 10, while the incoming liquid flow stream impinges a flat central impingement surface 51, the angled veins 55 direct the shattered and atomized liquid particles and pressurized air with an angular or helical movement that enables for more direct entry of the atomized liquid particles into the air cap discharge passages 44 with lesser impingement upon the exposed surface and redirection of the flow streams through the angle passages 44 and with minimal wear to the discharge orifices 42.

Hence, it can be seen that an internal mix pressurized air atomizing spray nozzle assembly is provided that is adapted for more effective and efficient atomization of liquids, such as lime slurries and the like, used in gas scrubbing and other applications. The spray nozzle assembly further is operable in such applications with less susceptibility to wear of the discharge orifices of the air cap, which heretofore could quickly alter spray performance and necessitate costly air cap replacement. The spray nozzle assembly also is relatively simple in construction and lends itself to economical manufacture. In this regard, when the diffuser is in a form separate from the post section upon which it is secured, it also is adaptable for easy field retrofitting. The separate diffuser further may to be made of a different and more wear-resistant material than the impingement post section upon which it is mounted.

The invention claimed is:

1. An internal mix air atomizing spray nozzle assembly comprising:
 a nozzle body having a central liquid flow passage for coupling to a pressurized liquid supply, said liquid flow passage having a discharge orifice from which pressurized liquid is directed along a central axis of the nozzle assembly;
 an air cap mounted at a downstream end of said nozzle body having an upstanding impingement post against which a pressurized liquid flow stream from said liquid discharge orifice impinges and is transversely directed;
 an air guide for coupling to a pressurized air supply for directing pressurized air into said air cap and about said impingement post for interaction with and atomizing liquid transversely directed by the impingement post;
 said air cap having an expansion chamber about said impingement post and a plurality of discharge orifice defining passages communicating with the expansion chamber disposed in circumferentially spaced relation about the impingement post;
 said air cap passages extending at a compound angle to the central axis for directing atomized liquid streams at a first angle outwardly of the central axis and at a second angle transverse to the central axis for discharging the atomized liquid from the air cap in an expanding conical spray pattern swirling in a predetermined rotative direction about the central axis; and
 said impingement post having a diffuser at an end thereof that defines a flat central impingement surface in aligned relation to said liquid discharge orifice and an outer annular array of non radial diffuser veins about the periphery of the impingement surface extending outwardly of the impingement surface for directing the atomized liquid and pressurized air in a swirling fashion about the impingement post in the same rotative direction as the spray pattern discharging from the air cap passages.

2. The pressurized air internal mix spray nozzle assembly of claim 1 in which said veins have a curved configuration which extend in a similar transverse direction relative to the central axis of said air cap passages.

3. The pressurized air internal mix spray nozzle assembly of claim 1 in which said veins define flow channels for directing liquid and pressurized air in the swirling direction about the impingement post.

4. The pressurized air internal mix spray nozzle assembly of claim 1 in which said air guide defines an annular air discharge opening, and said flat impingement surface has a circular configuration about the diameter of said air guide annular discharge opening.

5. The pressurized air internal mix spray nozzle assembly of claim 1 in which said air cap defines an annular air discharge opening and said diffuser veins define an outer diameter of the impingement post about the diameter of said air guide opening.

6. The pressurized air internal mix spray nozzle assembly of claim 1 in which said impingement post includes an upstanding post section fixed within said air cap, and said diffuser is a separate annular cap fixedly mounted on the post section.

7. The pressurized air internal mix spray nozzle assembly of claim 1 in which said diffuser has between 10 and 25 angled diffuser veins.

8. The pressurized air internal mix spray nozzle assembly of claim 1 in which said veins define flow channels which become deeper in a downstream direction as they progress outwardly away from the impingement surface.

9. The pressurized air internal mix spray nozzle assembly of claim 8 in which said diffuser has a conical upstream end, and said veins extend from a conical side wall of said upstream end.

10. The pressurized air internal mix spray nozzle assembly of claim 9 in which said diffuser has a conically shaped downstream end that tapers inwardly from an outer periphery of said veins toward said post section.

11. An internal mix air atomizing spray nozzle assembly comprising:
 a nozzle body having a central liquid flow passage for coupling to a pressurized liquid supply, said liquid flow passage having a discharge orifice from which pressurized liquid is directed along a central axis of the nozzle assembly;
 an air cap mounted at a downstream end of said nozzle body having an upstanding impingement post against which a pressurized liquid flow stream from said liquid discharge orifice impinges and is transversely directed;
 an air guide for coupling to a pressurized air supply for directing pressurized air into said air cap about said impingement post for interaction with and atomizing liquid transversely directed by the impingement post;
 said air cap having an expansion chamber about said impingement post and a plurality of discharge orifice defining passages communicating with the expansion chamber disposed in circumferentially spaced relation about the impingement post;
 said air cap passages extending at a compound angle to said central axis such that in a downstream direction the passages proceed both radially outwardly and transversely to the central axis for discharging atomized liquid in a conical spray pattern swirling in a predetermined rotative direction about the central axis; and said impingement post having a diffuser cap fixedly mounted on an end thereof that defines a flat central impingement surface in aligned relation to said liquid discharge orifice and an outer annular array of non radial diffuser veins about the periphery of the impingement surface extending outwardly of the impingement surface and in a similar transverse direction relative to the central axis as said air cap passages for directing the atomized liquid and pressurized air in a swirling fashion about the impingement post in the same rotative direction as the spray pattern discharge from the air cap passages.

12. The internal mix air atomizing spray nozzle assembly of claim 11 in which said diffuser cap is made of a different material than the impingement post upon which it is mounted.

13. The pressurized air internal mix spray nozzle assembly of claim 11 in which said veins have a curved configuration.

14. The pressurized air internal mix spray nozzle assembly of claim 11 in which said air cap defines an annular air discharge opening and said diffuser veins define an outer diameter of the impingement post about the diameter of said air guide opening.

15. The pressurized air internal mix spray nozzle assembly of claim 11 in which said veins define flow channels which become deeper as they progress outwardly away from the impingement surface.

16. An internal mix air atomizing spray nozzle assembly comprising:
a nozzle body having a central liquid flow passage for coupling to a pressurized liquid supply, said liquid flow passage having a discharge orifice from which pressurized liquid is directed along a central axis of said spray nozzle assembly;
an air cap mounted at a downstream end of said nozzle body having an upstanding impingement post against which a pressurized liquid flow stream from said liquid discharge orifice impinges and is transversely directed;
an air guide for coupling to a pressurized air supply for directing pressurized air into said air cap and about said impingement post for interaction with and atomizing liquid transversely directed by the impingement post;
said air cap having an expansion chamber about said impingement post and a plurality of discharge orifices defining passages communicating with the expansion chamber disposed in circumferentially spaced relation about the impingement post;
said air cap passages being angled with respect to said central axis for discharging atomized liquid flow streams outwardly of the air cap in a conical spray pattern swirling in a predetermined rotative direction about the central axis; and
said impingement post having a diffuser at an end thereof that defines a flat central impingement surface in aligned relation to said liquid discharge orifice and an outer annular array of non radial diffuser veins about the periphery of the impingement surface extending outwardly of the impingement surface for directing the atomized liquid and pressurized air in a swirling fashion about the impingement post in the same rotative direction as the rotative direction of the swirling spray pattern from the air cap passages.

17. The pressurized air internal mix spray nozzle assembly of claim 16 in which said veins have a curved configuration which turn in the same transverse direction relative to the central axis of said air cap passages.

18. The pressurized air internal mix spray nozzle assembly of claim 16 in which said veins define flow channels which become deeper as they progress outwardly away from the impingement surface.

19. The pressurized air internal mix spray nozzle assembly of claim 18 in which said diffuser has a conical upstream end, and said veins extend from a conical side wall of said upstream end.

20. The pressurized air internal mix spray nozzle assembly of claim 16 in which said air cap defines an annular air discharge opening and said diffuser veins define an outer diameter of the impingement post about the diameter of said air guide opening.

* * * * *